July 31, 1956  Z. B. CAPPS  2,756,764
PACKING GLAND ASSEMBLY
Filed Sept. 28, 1955

INVENTOR.
Zollie B. Capps
BY
Griswold & Burdick
ATTORNEYS

United States Patent Office 2,756,764
Patented July 31, 1956

2,756,764

PACKING GLAND ASSEMBLY

Zollie B. Capps, Freeport, Tex., assignor to The Dow Chemical Company, Midland, Mich., a corporation of Delaware Application September 28, 1955, Serial No. 537,144

4 Claims. (Cl. 137—315)

This invention relates to packing gland assemblies and particularly to a packing gland assembly having means for retaining internal pressure in a tubular system while replacing the packing between rotatable and non-rotatable members of the system.

The changing of packing in packing glands joining rotatable and non rotatable members becomes complicated when pressure must be maintained in the members above and below the packing glands at all times. Apparatus of the type disclosed and claimed in McIlhenny, Baker, and Clark's copending application, Serial No. 537,234, filed September 28, 1955, and entitled "Rotary Scoop Feeder" exemplifies the problems involved in changing packing materials in packing glands under the above mentioned conditions.

In rotary scoop feeder installations the circular plate containing the scoop or scoops extends outwardly from a centrally disposed hollow shaft which communicates with the scoops. The shaft extends downwardly through the bottom of the tank which contains the scoop feeder. The shaft, which is rotatable, is then fed into a stationary tubular member through which the inventory of the shaft is removed. Packing glands must be provided between the tank and shaft and between the shaft and stationary member.

Because of the granular or particulated nature of materials passing through the shaft, the packing in the packing glands must be frequently replaced. However, when conventional packing gland assemblies are utilized, considerable granular material is lost from the system during the repacking operation because of the pressure developed by the inventory in the tank.

Accordingly, a principal object of this invention is to provide an improved packing gland assembly in which the packing material may be changed without loss of pressure externally of the packing gland assembly.

In accordance with this invention each packing gland of the packing gland assembly is provided with a valve seat against which a valve on a rotatable member may seat when the rotatable member is moved axially prior to the removal of the packing material from the gland.

Additional objects and advantages of this invention will become apparent when the following detailed description is read in connection with the accompanying drawings, in which.

Figure 1:
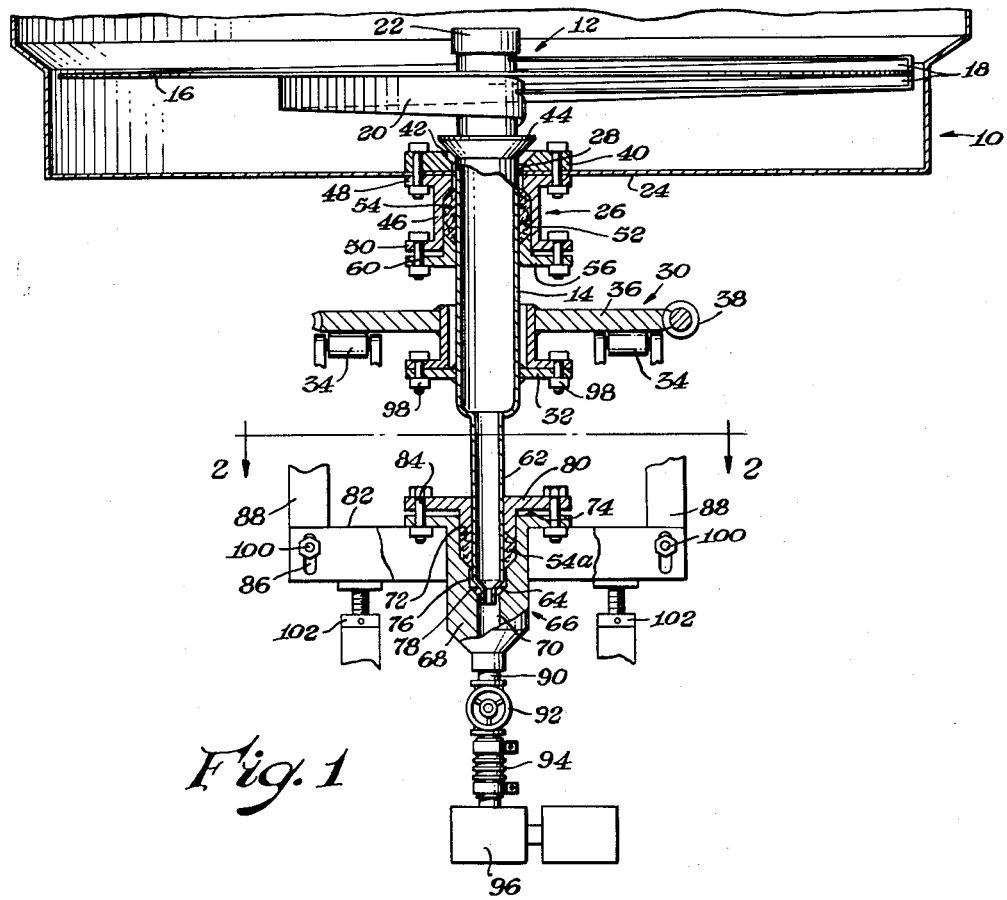
Fig. 1 is an elevational view, partly in section, of the lower end of a tank having a rotary scoop feeder installed therein and showing a packing gland assembly in accordance with this invention.
Figure 2:
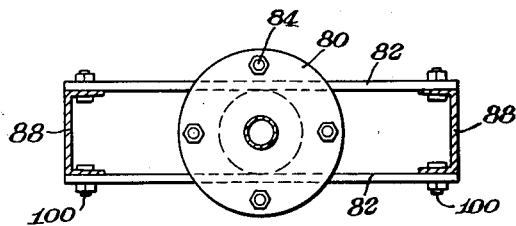
Fig. 2 is a sectional view taken along the line 2—2 of Fig. 1.

Referring to Fig. 1, there is shown the lower end of a tank 10, which may be a part of a continuous ion exchange system, which contains a rotary scoop feeder, indicated generally by the numeral 12. The feeder 12 includes a hollow centrally disposed shaft 14 from which extends a spiral plate 16 containing scoops 18. The scoops 18 communicate with the hollow shaft 14 by means of spiral passageways whose outer wall is indicated by the numeral 20.

The hollow shaft 14 is capped at its upper end 22. The part of the shaft 14 which lies below the scoops 18 extends downwardly through the bottom 24 of the tank 10, passing through a packing gland, indicated generally by the numeral 26, which is disposed around the aperture 28 in the tank bottom 24 through which the shaft 14 passes.

The rotary scoop feeder 12 is supported and rotated by means of a worm gear drive mechanism, indicated generally by the numeral 30, which is connected to a flange 29 and which is bolted to a flange 32 which is welded to the shaft. Thrust bearings 34 which contact the lower surface of the large gear 36 of the worm gear 38 drive mechanism support the feeder 12 within the tank 10.

The packing gland 26 includes an annular member 40 which fits around the periphery of the aperture 28 in the bottom 24 of the tank 10 and which includes a valve seat 42. A valve 44, provided on the shaft 14, is disposed above the seat 42 during operation of the roto scoop feeder 12. The body section 46 of the packing gland is a cylindrically shaped sleeve having outwardly extending flanges 48, 50 on each end thereof. The end of the body member having the flange 48 is secured to the bottom 12 of the tank 10 immediately below the annular member. The inner diameter of both the annular member 40 and the body member 46 at the tank bottom end of each part are identical and only slightly larger than the diameter of the shaft 14 which extends therethrough. The inner diameter of the lower part of the body member 46 contains a concentric counter bore 52 to provide space for packing material 54 to be inserted around the shaft. A packing follower 56 comprising a cylindrical sleeve having a flange 58 at its lower or base end extends into the body member 46 in the space between the counter bore 52 and the shaft 14. The flange 50 contains a plurality of bores through which the follower is secured by means of bolts 60 to the lower flange of the body member. Packing material 54 is disposed within the body member 46 in the space above the packing 56 follower and between the counter bore 52 and the shaft 14.

Figure 3:
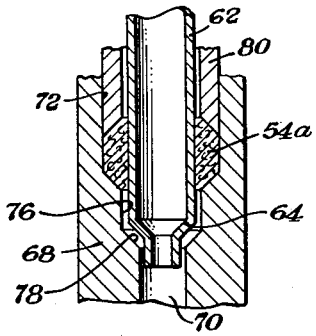
Fig. 3 is an enlarged fragmentary view of the lower end of the rotatable shaft of the roto scoop feeder which shows in detail the valve and seat at the lower end of the packing gland assembly.

Referring especially to Fig. 3, the lower part 62 of the shaft 14 is of reduced diameter and has at its lower end a tapered valve 64 integral with the end of the part 62 of the shaft 14. A second or lower packing gland, indicated generally by the numeral 66 is provided around the lower end of the shaft 14. The lower packing gland 66 includes a thick walled tubular body member 68 having an axially disposed bore 70 extending therethrough. The bore 70 includes two counter bores, the larger counter bore 72 being at the upper or follower receiving end 74 of the packing gland 66. The lower end of the lower counter bore 76 is tapered to provide a seat 78 for the valve 64 at the end of the shaft 14.

Packing material 54a is disposed within the large counter bore 72 and is compresed by a packing follower 80 which is similar in shape to the packing follower in the upper packing gland.

The lower packing gland body 68 is secured to a vertically adjustable support 82 by the bolts 84 which also secure the packing followed 80 to the body 68. The support 82 contains slots 86 near each end through which the support 82 may be bolted to fixed supports 88. The slots 86 permit small changes to be made in the position of the support 82.

The lower end of the bore 70 in the packing gland body 68 is threaded to permit the attachment thereto of a pipe 90 through which any material in the shaft 14 may be withdrawn. The piping system for withdrawal of material may conveniently include a valve 92, expansion coupling 94, and pump 96.

The operation of the packing gland asembly is such that the packing 54, 54a may be removed and replaced without spillage of materials or loss of pressure in the tank. To remove packing from both the upper (26) and lower packing gland (66), the bolts 98 are loosened from the flange 32, allowing the shaft 14 and roto scoop feeder 12 to drop and seat the valves 44 and 64 on their respective seats (42 and 78). When both valves are seated the passage of material through the shaft 14 or around it is prevented. The packing followers 56 and 80 may then be removed and additional packing material 54, 54a inserted in each of the packing glands. After the repacking operation is completed, the assembly may be returned to its operating position by loosening the bolts 100 which secure the support 82 to the fixed members 88 and then raising the shaft by means of jacks 102 until the flange 32 may be secured to the flange 29 on the drive and support structure. The raising of the shaft 14 will open the upper valve 44. The lower valve 64 is opened by lowering the jacks 102, returning the support 82 to its normal operating position and lowering the seat 76 away from the lower valve 64.

If only the packing 54a in the lower packing gland 66 need be replaced, the support 82 may be raised by means of the jacks 102 to seat only the lower valve 64. After the packing 54a is replaced, the support 82 is lowered to its normal operating position as described above.

The valve 92 may be closed, if desired, to prevent back flow of materials through the pipe from the pump.

From the above description it may be realized that the packing gland assembly of this invention is well adapted to permit the rapid changing of packing materials 54, 54a in the packing gland while retaining full pressure on the materials in the tank 10 or container into which the shaft 14 extends. Such an arrangement is especially beneficial when granular materials pass through and around the shaft 14 and because of excessive wear on the packing materials, cause frequent shutdowns to permit the packing material to be changed or replaced.

While the packing folowers 56, 80 have been described as being unitary structures, split followers may be used in order to permit the followers to be removed from the shaft 14 and thus provide better access to the packing glands.

I claim:

1. A packing gland assembly for effecting a fluid tight seal between two non-rotatable hollow members and a rotatable hollow shaft which is adapted to pass materials from one non-rotatable hollow member to the other, said assembly including a pair of packing glands, one of said packing glands being secured to and opening into each of said hollow members, each of said packing glands having an axially extending bore which extends through the gland, said bore including a counter bored packing and packing follower receiving segment and a valve seat segment which is spaced from the packing and packing follower segment, a packing follower adapted to fit into said packing and packing follower segment, a rotatable hollow shaft, said shaft extending into the bore of each packing gland, said shaft having two spaced apart valves along the periphery thereof, the spacing between said valves corresponding to the spacing between the valve seats of the two packing glands, the surface configuration of each valve being complementary to the surface configuration of the valve seat in said packing gland which is disposed closest thereto, and means for moving said shaft axially to effect the seating of said valves with said seats.

2. A packing gland assembly in accordance with claim 1, wherein gear drive means are provided for rotating said shaft and said means for moving said shaft axially is coupled to the gear drive means.

3. A packing gland assembly in accordance with claim 1, including means for axially moving one of said packing glands with respect to the other packing gland.

4. A packing gland in accordance with claim 1, wherein the valve seats are disposed in a part of the bore of the gland which is remote from said packing and packing follower segment of the bore.

No references cited.